(12) United States Patent
Shepherd

(10) Patent No.: US 6,423,773 B1
(45) Date of Patent: Jul. 23, 2002

(54) COATING COMPOSITION

(75) Inventor: John Victor Shepherd, Colchester (GB)

(73) Assignee: Arjobex Limited, Clacton-on-Sea (GB)

( * ) Notice: Subject to any disclaimer, the term of this patent is extended or adjusted under 35 U.S.C. 154(b) by 0 days.

(21) Appl. No.: 09/573,208

(22) Filed: May 19, 2000

(30) Foreign Application Priority Data

May 26, 1999 (GB) ............................................. 9912321
Mar. 23, 2000 (GB) ............................................. 0006890

(51) Int. Cl.⁷ ............................ C09D 5/00; C09D 7/00; C09D 7/12
(52) U.S. Cl. ....................... 524/600; 524/404; 524/405; 524/425; 524/433; 524/445; 524/527; 524/538; 106/218; 106/241; 106/481; 106/482; 106/483; 106/486; 428/211; 428/411.1; 428/474.4
(58) Field of Search ............................... 428/474.4, 211, 428/411.1; 106/486, 218, 241, 481, 482, 483; 524/404, 405, 445, 425, 433, 528, 538

(56) References Cited

U.S. PATENT DOCUMENTS 6,197,880 B1 * 3/2001 Nigam ........................ 524/845

FOREIGN PATENT DOCUMENTS

| EP | 047760 A2 | * | 2/1992 |
| GB | 1470372 | * | 4/1977 |
| GB | 2177413 A | * | 1/1987 |

* cited by examiner

Primary Examiner—P. Hampton-Hightower
(74) Attorney, Agent, or Firm—Nixon & Vanderhye

(57) ABSTRACT

Polymer coating composition for a plastics substrate including a polymeric binder and an inert filler. The composition also includes polyamide epichlorohydrin and an ionic insolubilizing agent that is capable of reacting with the binder to render the binder insoluble in water.

13 Claims, No Drawings

COATING COMPOSITION

BACKGROUND OF THE INVENTION

This invention relates to a coating composition for a plastics substrate.

Plastics substrates are generally impervious to materials such as printing inks. Thus, they tend to be unsuitable for direct use in ink-based printing processes because the ink has a tendency to remain at the surface of the substrate, without being absorbed.

It is well known to modify the surface characteristics of a plastics substrate by applying an absorbent coating composition to the substrate's surface. The coating composition comprises an absorbent filler, which renders the substrate more absorbent to ink, and a polymeric binder, which binds the filler to the substrate's surface.

Both water-based and solvent-based coating compositions are known. Solvent-based coating compositions generally show better adhesion properties to plastics substrates than water-based compositions. However, water-based compositions are preferred for environmental reasons, even though they can be picked or soaked off relatively easily. This problem may be alleviated by increasing the ratio of binder to filler in the coating composition. However, this reduces the absorbency of the coating, thereby reducing its ink retention properties. The water-sensitivity of water-based coatings is generally improved by including a cross-linking agent in the coating. This also reduces the tendency of such coatings to stick together, which is otherwise a problem when stacking sheets.

GB 2 177 413 describes the use of melamine formaldehyde and urea-formaldehyde resins as cross-linkers, to rigidify the coating composition and reduce its water-sensitivity. However, in view of the health concern over formaldehyde fumes, GB 2 177 413 proposes to replace the formaldehyde resins with a zirconium compound. The zirconium compound acts as cross-linking agent, and reacts with carboxyl groups present in the binder to render the binder substantially insoluble, and thus water-resistant. Suitable insolubilizing agents include aqueous zirconium compounds, such as ammonium zirconium carbonate (AZC).

Although the coating compositions of GB 2 177 413 work relatively well, it is desirable to improve the water resistance and adherence of these polymer coatings further.

Polyamide epichlorohydrin is known to be an effective cross-linking agent for cellulose paper. However, because it is a covalent compound, it has a tendency to retain static charge. These charges are difficult to dissipate and may cause overlying substrates to adhere to one another, making the substrates difficult to handle in subsequent processing operations (eg when feeding the substrate into a sheet feed printing process).

DESCRIPTION OF THE INVENTION

We have now found that by using polyamide epichlorohydrin as a cross-linking in the presence of an ionic insolubilising agent like ammonium zirconium carbonate, the static problems encountered when polyamide is employed on its own are not observed. The resulting coating composition also has desirable adherence and water resistant properties. The resulting coating composition also has desirable solvent resistant properties.

According to the present invention, there is provided a polymer coating composition for a plastics substrate, said composition comprising a polymeric binder and an inert filler, characterised in that said composition further comprises polyamide epichlorohydrin and an ionic insolubilising agent that is capable of reacting with the binder to render said binder insoluble in water.

The present invention also provides a synthetic paper comprising a plastics substrate and a polymer coating composition as described above, wherein said coating forms 1 to 40% of the total weight of the substrate and coating.

In this application, the term "synthetic paper" means a plastics material having the feel and printability characteristics of cellulose paper.

The coating of the coated synthetic paper of the invention preferably has a static decay time (the half life of an induced charge on the surface of the sheet) of less than 1 minute at 50% relative humidity, and preferably less than 10 seconds.

The polymeric binder employed in the composition of the present invention may be in aqueous solution or latex suspension, preferably the latter. The polymeric binder may contain a functional group on the polymer chain of at least one polymeric constituent, which is capable of reacting with the insolubilizing agent to render the binder insoluble. Examples of such functional groups include carboxyl, amines, alcohols, polyols, hydroxyls and sulfides. These groups may react with the insolubilizing agent when the coating composition is heated, for example, to 60° C. or more. Heating, however, is not necessary and the insolubilising agent may react with the binder even at temperatures as low as 10° C. The binder may comprise a single polymer or a mixture of polymers. For example, the binder may comprise starch or protein modified chemically or physically, by the addition of other polymeric species to provide the required functional groups. Alternatively, the polymeric binder may comprise a styrene-butadiene copolymer, an acrylic polymer or copolymer, a vinyl acetate polymer or copolymer, a vinyl acetate-ethylene copolymer, a polyvinyl alcohol polymer or copolymer, and/or a polyvinyl pyrodidene polymer or copolymer. Preferably, styrene-butadiene, acrylic and vinyl acetate-ethylene copolymers are employed. Such binders may also contain other polymeric species provided they do not interfere undesirably with the properties of the coating. For example, a styrene-butadiene copolymer latex may be incorporated in an acrylic latex binder to modify the flexibility and toughness of a dried coating.

The binder content of the aqueous coating composition of this invention is chosen to suit individual requirements. Preferably, the concentration of binder in the coating composition is less than 60%, preferably, less than 50%, most preferably, less than 30% of the total dry weight of the coating composition.

The filler may be any suitable inert filler which is capable of rendering the coated plastics substrate absorbent to ink. Examples of suitable fillers include calcium carbonate, china clay, titanium dioxide, silica (eg amorphous silica), barium sulphate, calcium sulphate and aluminium hydroxide. The filler may form 50 to 95%, preferably 60 to 90%, most preferably 70 to 90% of the dry weight of the coating composition.

The insolubilizing agent for the polymeric binder is preferably water soluble and/or water miscible, so as to be reactive with the polymeric binder, so as to be reactive with the polymeric binder to render it relatively unaffected by water. Suitable ionic insolubilizing agents include ammonium zinc carbonate, disodium tetraborate (BORAX) and, preferably, ammonium zirconium carbonate. For latex-based coating compositions the polyanionic compounds are suitable and ammonium zirconium carbonate are particularly preferred.

Any suitable polyamide-epichlorohydrin may be employed. Examples of such polymers are sold under the trade marks KYMENE and POLYCUP. Polyamide epichlorohydrins are self cross-linking agents. Thus, unlike many of the ionic insolubilising agents described above, they do not that have to react with active functional groups in the polymeric binder to impart water resistant properties to the resulting coating composition. Instead, polyamide epichlorohydrins can impart water resistant characteristics to the coating composition by cross-linking with other molecules of polyamide epichlorohydrin. This cross-linking may be achieved at temperatures as low as 10° C.

The ratio of polyamide epichlorohydrin to ionic insolubilising agent employed may be adjusted such that desirable adhesion, anti-static and water resistance are achieved. Where it is desirable to increase anti-static properties of the polymer coating composition, the relative proportion of ionic solubilising agent in the coating composition may be increased. Where it is desirable to increase the adhesive and/or water resistance of the polymer composition, the proportion of polyamide epichlorohydrin in the composition may be increased. Typically, the ratio of polyamide epichlorohydrin to ionic insolubilising agent employed is 1–20:20–1. Preferably, the combined concentration of polyamide epichlorohydrin and ionic insolubilising agent is less than 30%, more preferably less than 20%, and most preferably, less than 15% of the total dry weight of the coating composition. This combined concentration may be less than 15%, preferably, less than 10% (eg 5%) of the total binder concentration.

The coating composition may contain additional components, such as processing aids. Examples of suitable processing aids are stearates, especially calcium stearate. These processing aids may improve the behaviour of the coating composition when being applied to a substrate using coating machinery.

Preferably, the coating composition of the present invention has a density of 0.3 to 0.7 g/cm$^3$. It is advantageous that the density of the present coating is maintained within this specified range. This is because at densities lower than 0.3 g/cm$^3$, the integrity of the coating is compromised, and at densities above 0.7 g/cm$^3$, the absorbency of the coating is decreased to less effective levels. More preferably, the density range is between 0.4 and 0.6, even more preferably 0.55 and 0.45 g/cm$^3$. The desired density range may be achieved by selecting a filler with an oil absorption of greater than 50 cm$^3$/g. Preferably, he oil absorption of the filler is between 50 and 200 cm$^3$/g, more preferably, between 80 and 200 cm$^3$/g. Additionally, or alternatively, the binder to filler dry weight ratios may be adjusted until the desired density is achieved.

The coating composition of the present invention may be applied to the plastic substrate by any known applicable technique and where the substrate is in film or sheet form such as a synthetic paper, paper coating techniques will normally be employed such as roller coating with air-knife metering. However, print-coating may also be employed. The thickness of the wet coating may be for example be in the range appropriate to give a dry coating weight of from 5 to 30 g/m$^2$ preferably in the region of 10 g/m$^2$.

Drying of the wet coating may be by any means whereby the temperature may be adequately controlled to keep the coated plastics substrate substantially undistorted. For a polyethylene sheet, this temperature is preferably below 100° C. but above 60° C. In the case of coatings on synthetic papers for example, air drying temperatures in the region of 60° C.–70° C. may be advantageously employed to achieve adequately rapid drying while preserving a uniform dried coating.

It will be appreciated that the plastic substrate may be comprised of any plastics material. However, particularly where the surface of such plastics material is strongly hydrophobic, modification of the surface by known chemical or corona discharge treatment may be desirable prior to coating to assist wetting by the coating composition during the coating to assist wetting by the coating composition during the coating operation and/or to assist in achieving a good bond between dried coating and substrate. Preferred plastic substrates are synthetic papers as described and claimed in British Patent Specification 1470372 incorporated herein by reference.

TABLE 1

| Components | Ex. 1 | Comparative Ex. A | Comparative Ex. B | Comparative Ex. C |
|---|---|---|---|---|
| i) water | 400 | 400 | 400 | 400 |
| ii) ammonia | 2 | 2 | 5 | 5 |
| iii) DISPEX N40 | 0.6 | 1 | 1 | 1 |
| iv) DEFOAMER 1512 | 0.1 | 0 | 0 | 0 |
| v) ALPHENATE TH154 | 0.5 | 1 | 1 | 1 |
| vi) ZEOLEX 123 | 78 | 78 | 78 | 78 |
| vii) MARTIFIN OL-107 | 315 | 315 | 315 | 315 |
| viii) ARCONAL 728 | 230 | 230 | 230 | 230 |
| ix) ARCONAL 504 | 53 | 53 | 53 | 53 |
| x) BACOTE | 27.5 | 55 | 0 | 0 |
| xi) KYMENE SLX2 | 35 | 0 | 70 | 23 |

DISPEX N40 (anionic dispersant from ALLIED COLLOIDS)
DEFOAMER 1512 (defoamer from HERCULES LTD)
ALPHENATE TH154 (Sodium dioctyl sulphosuccinate from Hercules)
ZEOLEX 123 (precipitated synthetic aluminium silicate from zeofin OY)
MARTIFIN OL-107 (Aluminium hydroxide from Plus Stauffer)
ARCONAL 728 (Styrene/n-butanol copolymer 50% aqueoues dispersion from BASF) MFT (minimum film forming temperature)=20
ARCONAL 504 (Acrylonitrile/n-butyl acrylates/styrene copolymer 50% aqueous dispersion) MFT (minimum film forming temperature)=0
BACOTE (ammonium zirconium carboante from MEL 20% active
KYMENE SLX2 (polaymide-epichlorohydrin resin from Hercules 13% active)

Table 1 above summarises the compositional make-up of the water-based coating compositions of Example 1, and those of Comparative Examples A, B, and C. The coating compositions were prepared using a conventional method, as follows: Components i) to vii) were stirred with high shear to facilitate dispersion. After 45 minutes, the binders (components viii and ix) were added under low shear conditions. After a further 20 minutes (approx.), the crosslinking agents (components x and xi) were added and the resulting mixture was stirred under low shear conditions for an additional 15 minutes. The final solids of the mixture was adjusted with water to 45%, and the viscosity of the mixture was approximately 100 cP using spindle 2 of a Rheology International rotational viscometer at 20 rpm. The pH of the mixture was 8.5 in each case.

The mixtures were individually coated onto a filled coextruded polyethylene sheet. This sheet was made as set out in EP 0470760 to give a substance of 70 gsm with a density of about 0.72. The coating was applied by a conventional method of excess coating from a roller to the sheet with the final coatweight adjusted to 10 gsm using an air knife. The speed of the web was 100 m/min and the coating was applied first to one side of the plastic sheet and dried and then to the other side of the sheet and again dried. The drying ovens were 30 m long and the maximum temperature of the dried sheet in the oven was approximately 70°. The conditions employed for each coating mixture were approximately the same.

Samples of the finished coated material were tested to determine their usefulness for sheet fed lithographic printing. The following tests were used:

Static decay time—this measures the half life of an induced charge on the surface of the sheet and illustrates the likely build up of charge in a pile of sheets. A half life of greater than about one minute will lead to static problems in the feeding of sheets through a press. This was measured at 23° and 50% relative humidity.

Surface resitivity—If the surface resistivity is >$10^{12}$ ohm per square there is likely to be little discharge of static charge. With a resistivity <$10^{12}$ ohm per square static can leak to earth. This was measured at 23° and 50% relative humidity.

Rate of water absorption—This was measured by an independent test house (PIRA) using an IGT printability tester (electrical model) test apparatus which is described in ISO 3783. The particular test used measured the time taken for a 0.5$\mu$ film of water to disappear from the surface of the substrate. The shorter the time, the greater the rate of water absorption.

Wet pick—This was determined by PIRA using the IGT printability tester (electrical model) in the following manner:

Strips of the samples were printed on the IGT printability tester using IGT black testing ink. Prior to printing, a controlled film of water was applied to the strips, by means of the dampening unit on the tester. A printing pressure of 200 N/cm and a constant velocity of 1.6 m/sec were used. An ink film thickness of 2$\mu$ and a water film thickness of 0.5$\mu$ were applied. After each print the printing disc was examined for any coating removal. A further test using a 1.5$\mu$ water film is also carried out to simulate more severe conditions. The condition of the coating is reported.

Oil pick—This was determined using low viscosity oil and the method detailed in ISO 3783. This figure should be above about 135 cm/sec to ensure that the coating does not pick under dry conditions for conventional lithographic inks.

Table 2 gives the results of these tests for Example 1, and Comparative Examples A, B and C. From these results it is clear that whilst all four materials have adequate oil pick the other parameters show significant differences. EXAMPLE 1 provides good results in the other four test categories, and in particular, shows a desirably low static decay time, in combination with good wet pick characteristics.

The coating compositions of example 1 and comparative examples A, B and C were made into sheet materials. Static problems were encountered with comparative examples B and C and for this reason it was difficult to form sheets out of these compositions.

TABLE 2

| COATING | 1 | A | B | C |
| --- | --- | --- | --- | --- |
| STATIC DECAY TIME | <10 sec | <10 sec | >1 minute | >1 minute |
| RATE OF WATER ABSORPTION (sec) | 0.5–1 | 2–4 | 1 | 0.5–1 |
| RESISTIVITY (ohm per square) | <$10^{12}$ | <$10^{12}$ | >$10^{12}$ | >$10^{12}$ |
| WET PICK (visual inspection of damage) | no damage with 1.5$\mu$ water film | pick with 1.5$\mu$ water film | no damage with 1.5$\mu$ water film | no damage with 1.5$\mu$ water film |
| OIL PICK (cm/s) | >150 | >150 | >150 | >150 |

I claim:

1. A polymer coating composition for plastics a substrate, said composition comprising a polymeric binder and an inert filler, wherein said composition further comprises polyamide epichlorohydrin and an ionic insolubilizing agent that reacts with the binder to render said binder insoluble in water.

2. A coating composition as claimed in claim 1, which has a static decay of less than 1 minute at 50% relative humidity.

3. A coating composition as claimed in claim 1, wherein the ratio of polyamide epichlorohydrin to ionic insolubilizing agent employed is 1–20: 20–1.

4. A coating composition as claimed in claim 1, wherein the combined concentration of polyamide epichlorohydrin and ionic insolubilizing agent is less than 30% of the total dry weight of said coating.

5. A coating composition as claimed in claim 4, wherein said combined concentration is less than 15% of the total binder concentration in said coating.

6. A coating composition as claimed in claim 1, wherein the ionic insolubilizing agent is selected from the group consisting of ammonium zinc carbonate, disodium tetraborate (BORAX) and ammonium zirconium carbonate.

7. A coating composition as claimed in claim 6, wherein the ionic insolubilizing agent is ammonium zirconium carbonate.

8. A coating composition as claimed in claim 1, wherein the polymeric binder contains at least one functional group selected from the group consisting of carboxyl, amines, alcohols, polyols, hydroxyls and sulfides.

9. A coating composition as claimed in claim 1, wherein the filler is at least one filler selected from the group consisting of calcium carbonate, china clay, titanium dioxide, silica, barium sulphate, calcium sulphate and aluminium hydroxide.

10. A coating as claimed in claim 1 which comprises at least one processing aid.

11. A coating as claimed in claim 1 having a density of 0.3 to 0.7 g/cm$^3$.

12. A synthetic paper comprising a plastics substrate and a polymer coating composition as claimed in claim 1, wherein said coating forms 1 to 40% of the total weight of the substrate and coating.

13. A coating composition as claimed in claim 9, wherein said silica is amorphous silica.

* * * * *